(12) United States Patent
Karri et al.

(10) Patent No.: US 11,940,841 B2
(45) Date of Patent: Mar. 26, 2024

(54) ARTICULATED DISPLAY OF FLEXIBLE DISPLAY DEVICE DIVIDABLE INTO SEPARATE UNITS

(71) Applicant: International Business Machines Corporation, Armonk, NY (US)

(72) Inventors: Venkata Vara Prasad Karri, Visakhapatnam (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 17/304,336

(22) Filed: Jun. 18, 2021

(65) Prior Publication Data
US 2022/0404870 A1    Dec. 22, 2022

(51) Int. Cl.
*G06F 1/16* (2006.01)

(52) U.S. Cl.
CPC .......... *G06F 1/1652* (2013.01); *G06F 1/1654* (2013.01); *G06F 1/1679* (2013.01)

(58) Field of Classification Search
CPC .... G06F 1/1652; G06F 1/1654; G06F 1/1679; G06F 1/1656; G06F 1/26
See application file for complete search history.

(56) References Cited

U.S. PATENT DOCUMENTS

| | | | | |
|---|---|---|---|---|
| 6,628,244 B1 * | 9/2003 | Hirosawa | .............. | G06F 1/1698 |
| | | | | 345/1.1 |
| 7,786,951 B2 | 8/2010 | Huitema | | |
| 8,376,581 B2 * | 2/2013 | Auld | ................... | G09F 15/0062 |
| | | | | 345/55 |
| 8,851,372 B2 * | 10/2014 | Zhou | ..................... | H04B 1/385 |
| | | | | 455/66.1 |

(Continued)

FOREIGN PATENT DOCUMENTS

| | | |
|---|---|---|
| CN | 105373364 A | 3/2016 |
| CN | 106997283 A | 4/2020 |

(Continued)

OTHER PUBLICATIONS

"Samsung Electronics' Foldable Phone, Rollable Phone, and Streetchable Phone are just around the corner!", Foldable Phone Media, Dec. 22, 2018, 4 pages, <https://www.phonefoldable.com/samsung-electronics-foldable-phone-rollable-phone-and-streetchable-phone-are-just-around-the-corner/>.

(Continued)

*Primary Examiner* — Temesghen Ghebretinsae
*Assistant Examiner* — K. Kiyabu
(74) *Attorney, Agent, or Firm* — Michael A. Petrocelli

(57) ABSTRACT

A flexible display of a flexible display device can be divided and have removable sections for use as one or more wearable devices. The flexible display can be divided into a plurality of portions. The plurality of portions are divided along a plurality of dividing lines each having a locking (Continued)

mechanism, respectively. A power supply is electrically connected to the locking mechanisms to activate and deactivate the locking mechanisms. A portion of the plurality of portions border corresponding locking mechanisms along corresponding dividing lines of the plurality of dividing lines. The portion is selectable for decoupling and removal, in response to deactivation of the corresponding locking mechanisms for the portion of the flexible display.

20 Claims, 8 Drawing Sheets

(56) References Cited

U.S. PATENT DOCUMENTS

| | | | |
|---|---|---|---|
| 9,177,492 B2 | 11/2015 | Wong | |
| 9,524,199 B2* | 12/2016 | Liu | G06F 1/181 |
| 9,560,178 B1* | 1/2017 | Stetson | G06F 1/1626 |
| 9,621,229 B2* | 4/2017 | Fishman | G06F 1/3234 |
| 9,823,703 B2* | 11/2017 | Eremenko | H04M 1/0254 |
| 9,917,936 B2* | 3/2018 | Gadi | H04B 1/3888 |
| 9,936,111 B1* | 4/2018 | Stetson | G06F 1/1658 |
| 10,216,227 B2 | 2/2019 | Jin | |
| 10,324,539 B2* | 6/2019 | Riley | G06F 3/015 |
| 11,086,126 B1* | 8/2021 | Gollier | G02B 27/0172 |
| 11,103,033 B1* | 8/2021 | Ziegenbein | A44C 5/16 |
| 11,665,837 B2* | 5/2023 | Kim | H05K 5/0217 361/807 |
| 11,747,769 B2* | 9/2023 | Connor | G04G 17/08 368/10 |
| 2004/0012191 A1* | 1/2004 | Stark | B42F 11/00 281/51 |
| 2007/0279852 A1* | 12/2007 | Daniel | H04B 1/385 361/728 |
| 2010/0064244 A1* | 3/2010 | Kilpatrick, II | H04M 1/0243 345/1.3 |
| 2010/0117975 A1* | 5/2010 | Cho | G06F 3/04883 345/173 |
| 2013/0271940 A1* | 10/2013 | Cope | H05K 5/0217 361/809 |
| 2014/0159867 A1* | 6/2014 | Sartee | G08B 5/36 340/6.1 |
| 2014/0232617 A1* | 8/2014 | Anite | G06F 3/1446 345/1.3 |
| 2014/0337621 A1* | 11/2014 | Nakhimov | H04W 12/068 713/168 |
| 2015/0309535 A1* | 10/2015 | Connor | A61B 5/1477 361/679.03 |
| 2015/0378391 A1* | 12/2015 | Huitema | H05K 1/183 361/679.03 |
| 2015/0378393 A1* | 12/2015 | Erad | G06F 3/1446 345/1.3 |
| 2016/0018846 A1* | 1/2016 | Zenoff | G06F 1/1647 345/204 |
| 2016/0066660 A1* | 3/2016 | Pluemer | A44C 5/14 224/165 |
| 2016/0241688 A1* | 8/2016 | Vossoughi | H04M 1/0262 |
| 2017/0004803 A1* | 1/2017 | Bostick | G06F 1/1647 |
| 2017/0038641 A1* | 2/2017 | Yamazaki | G02F 1/133308 |
| 2017/0085686 A1* | 3/2017 | Gilchrist | H04M 1/0254 |
| 2019/0000166 A1* | 1/2019 | Pandolfino | A44B 11/2596 |
| 2019/0014200 A1* | 1/2019 | Cho | H04M 1/7246 |
| 2019/0137947 A1* | 5/2019 | Yaghmour | H01R 13/5219 |
| 2019/0205011 A1 | 7/2019 | Li | |
| 2021/0124543 A1* | 4/2021 | Joo | G06F 1/1641 |
| 2021/0149437 A1* | 5/2021 | Yamazaki | H02J 7/00302 |
| 2023/0384825 A1* | 11/2023 | Connor | G06F 1/1624 |

FOREIGN PATENT DOCUMENTS

| | | | | |
|---|---|---|---|---|
| EP | 2395497 B1 | 11/2013 | | |
| KR | 20130117429 A | * 10/2013 | | |
| WO | WO-2016083850 A2 | * 6/2016 | | G06F 1/163 |
| WO | WO-2017111192 A1 | * 6/2017 | | |

OTHER PUBLICATIONS

Edwards, Luke, "Samsung rollable OLED tablet gets fingerprint sensor, ready to become a reality", T3, last updated Jun. 8, 2018, 3 pages, <https://www.t3.com/news/samsung-rollable-oled-tablet-gets-fingerprint-sensor-ready-to-become-a-reality>.

Lee, et al., "Determining ergonomic forms for rollable display devices", HFES 2018 Annual Meeting, Oct. 2018, 2 pages, <https://www.researchgate.net/publication/328333412_Determining_ergonomic_forms_for_rollable_display_devices>.

Mell, et al., "The NIST Definition of Cloud Computing", National Institute of Standards and Technology, Special Publication 800-145, Sep. 2011, 7 pages.

Sathiah, Sanjiv, "New LG patent shows rollable smartphone/tablet concept", NotebookCheck, Dec. 28, 2018, 4 pages, <https://www.notebookcheck.net/New-LG-patent-shows-rollable-smartphone-tablet-concept.387636.0.html>.

Zarkov, Georgi, "Apple patented rollable display tech that can be used for anything from watches to TVs", PhoneArena.com, Feb. 18, 2019, 3 pages, <https://www.phonearena.com/news/Apple-patented-rollable-display-technology-watches-televisions_id113770>.

* cited by examiner

ARTICULATED DISPLAY OF FLEXIBLE DISPLAY DEVICE DIVIDABLE INTO SEPARATE UNITS

BACKGROUND

The present disclosure relates to articulated devices having flexible displays, and more specifically, the present disclosure relates to dividing an articulated display of a flexible display device having a flexible display into usable physically separated units.

Mobile devices can have different size displays and some are adjustable, or foldable. Wearable display devices can be popular for use in various situations, such as smartwatches, and other devices. Such device can be convenient as well as easily carried on a person. Further, these devices can provide a variety of useful information to a user. Moreover, such devices can be used for various purposes, like tracking biometrics, gestures, etc. Wearable devices typically have display capabilities to show various digital content. Such displays are by their nature small in design, and can be difficult to read, or display a large quantity of information, and/or access using touch sensitivity.

SUMMARY

The present disclosure recognizes the shortcomings and problems associated with current techniques for dividing an articulated device having a flexible display into multiple units, for example, for wearable devices.

One problem with typical smart devices or mobile device can include a lack of ability for the device and/or a display of one device to be used as another device or unit such as a wearable device, or used functionally with another device or unit or wearable device.

Carrying multiple devices can be difficult in that every time a user may not want to use each of the wearable devices, or might want to expand the aggregated display area for content interaction, they would have to store, carry, and handle multiple devices.

The method and system of the present invention enables a user to keep each of a multiplicity of wearable devices together, and the device can split the display area to create individual wearable devices for the user as per the need.

In one embodiment according to the present invention, a flexible display such as a rollable display for a mobile device can be used to reduce the size or general product dimensions for the device. For example, a device or a wearable device with a flexible or rollable display can be reduced to a shape of a pen, and in one example, as required, a user can expand the display surface. For example, a wearable device can include a wristwatch, a finger mounted device, or other device worn on the wrist of a person, etc. In one example, the device can be articulated and can have a flexible display. The articulated device can be detached into pieces and used as a wearable device or as part of another wearable device. The articulated device can be flexible decoupled as predefined pieces, and also reassembled into a single articulated device with a flexible display.

In an aspect according to the present invention, a method for dividing a flexible display of a flexible display device into an articulated flexible display having removable sections for use as one or more wearable devices can include articulating a display of a flexible display device into a plurality of portions. The plurality of portions are divided along a plurality of dividing lines each having a locking mechanism, respectively, of a plurality of locking mechanisms. The method includes connecting electrically a power supply to the locking mechanisms to activate and deactivate the locking mechanisms. A portion of the plurality of portions borders corresponding locking mechanisms of the plurality of locking mechanisms along corresponding dividing lines of the plurality of dividing lines. The portion is selectable for decoupling and removal, in response to deactivation of the corresponding locking mechanisms for the portion.

In a related aspect, the selected portion is replaceable, in response to removal of the selected portion, and the corresponding locking mechanisms are activatable, in response to the selected portion being replaced.

In a related aspect, the locking mechanisms are activatable to couple the portions to each other to secure the plurality of portions, and one or more locking mechanisms of the plurality of locking mechanisms being selectably deactivatable to decouple corresponding one or more portions of the plurality of portions from each other to release the one or more portions.

In a related aspect, the method can further include housing a computer within the flexible display device, and operatively connecting the computer to the plurality of locking mechanisms for managing the activation and deactivation of the locking mechanisms using the power supply.

In a related aspect, the flexible display can be rollable.

In a related aspect, the plurality of locking mechanisms are magnetic.

In a related aspect, wireless power is providable, using the flexible display device, to a portion in response to the portion being removed.

In a related aspect, the method further including a plurality of portions being selectable for removal; and corresponding locking mechanisms to the selected portions being deactivatable between the selected portions and other contiguous portions, the locking mechanisms being along the dividing lines, respectively, for the selected portions, which enables decoupling of the selected flexible portions.

In a related aspect, the method further including receiving a request from an augmented reality (AR) device to depict instructions or provide a simulation for dividing and decoupling the selected portion; generate, using the computer, the instructions or the simulation; sending the instructions or the simulation to the AR device; and displaying the instructions or the simulation on a display of the AR device.

In another aspect according to the present invention, a computer-implemented method for dividing a flexible display of a flexible display device into an articulated flexible display having removable sections for use as one or more wearable devices can include deactivating locking mechanisms for a portion of an articulated display of a flexible display device. The locking mechanisms are part of a plurality of locking mechanisms along predetermined dividing lines of the articulated display of the flexible display device. The predetermined dividing lines of the flexible device defining a plurality of portions of the flexible display device which includes the portion, and the plurality of portions being contiguous with each other. The method includes enabling decoupling and removal of the portion of the flexible display device by the deactivating of the locking mechanisms, and initiating activation of one or more locking mechanisms of the plurality of locking mechanisms, in response to the portion of the flexible display device being removed from the flexible display device, to lock remaining contiguous portions of the flexible display device.

In a related aspect, the deactivating of the locking mechanisms for the portion of the articulated display of the flexible display device, is in response to a selection received at a computer of the flexible display device.

In a related aspect, the method further including generating a menu using a computer of the flexible display device, the menu displaying portions of the articulated display for dividing or splitting from the flexible display device; receiving a selection from the menu, the selection indicating a selected portion from the displayed portions for decoupling and removal from the contiguous plurality of portions, and wherein; the enabling of the decoupling and the removal of the portion, which includes the selected portion, is in response to the receiving of the selection from the menu.

In a related aspect, in response to activating or deactivating the locking mechanisms, the locking mechanisms couple and decouple corresponding portions of the plurality of portions, respectively, for securing the plurality of portions together contiguously or for releasing the plurality of portions, respectively.

In a related aspect, the method further including providing power to the plurality of locking mechanisms using the flexible display device, and providing wireless power to a removed portion using the flexible display device.

In a related aspect, the method further includes receiving a request form an AR device to depict instructions or provide a simulation for dividing and decoupling the selected flexible portion; generate, using the computer, the instructions or the simulation; sending the instructions or the simulation to the AR device; and displaying the instructions or the simulation on a display of the AR device.

In a related aspect, the method further includes receiving a selection, using a computer, of the flexible display device.

In a related aspect, the method further includes receiving, using a computer of the flexible display device, a request for the initiating of the deactivation of the locking mechanisms for the portion of the flexible display device, the locking mechanisms is part of a plurality of locking mechanisms along predetermined dividing lines of a flexible display of the flexible display device. The predetermined dividing lines of the flexible device defining a plurality of portions of the flexible display device which includes the portion, the plurality of portions being contiguous with each other, the request specifying a wearable device corresponding to the request to divide the flexible display; analyzing the request to determine which of the flexible portions to select for the wearable device; and selecting a flexible portion of the plurality of flexible portions based on the analysis.

In a related aspect, the portions of the flexible display device are selectable by a user, and the method further comprising: receiving a selection for the portion of the flexible display device.

In a related aspect, the method further includes: receiving a selection one or more locking mechanisms of the plurality of locking mechanisms for deactivation, one or more portions of the plurality of portions being replaceable between one or more remaining portions of the plurality of portions; and forming contiguous flexible portions being coupleable in response to activation of the one or more locking mechanisms, in response to the one or more portions being replaced.

In another aspect according to the present invention, a flexible display device includes a divided articulated flexible display having removable sections for use as one or more wearable devices, which includes: a flexible display of a flexible display device divided into a plurality of portions, the plurality of portions being divided along a plurality of dividing lines each having a locking mechanism, respectively, of a plurality of locking mechanisms, thereby the plurality of portions being contiguous with each other; a power supply, housed within the electrical display device, electrically communicating with the plurality of locking mechanisms, the power supply being switchable on and off to activate and deactivate the locking mechanisms, respectively, and wherein one or more of the locking mechanisms are activatable to secure the portions to each other to enable coupling of one or more portions of the plurality of portions, and the locking mechanisms are deactivatable to release one or more portions of the plurality of portions from each other to enable decoupling and removal of the one or more portions; and a computer housed within the flexible display device, and the computer operatively connected to the plurality of locking mechanisms for managing the activation and deactivation of the locking mechanisms using the power supply.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

Figure 1A:
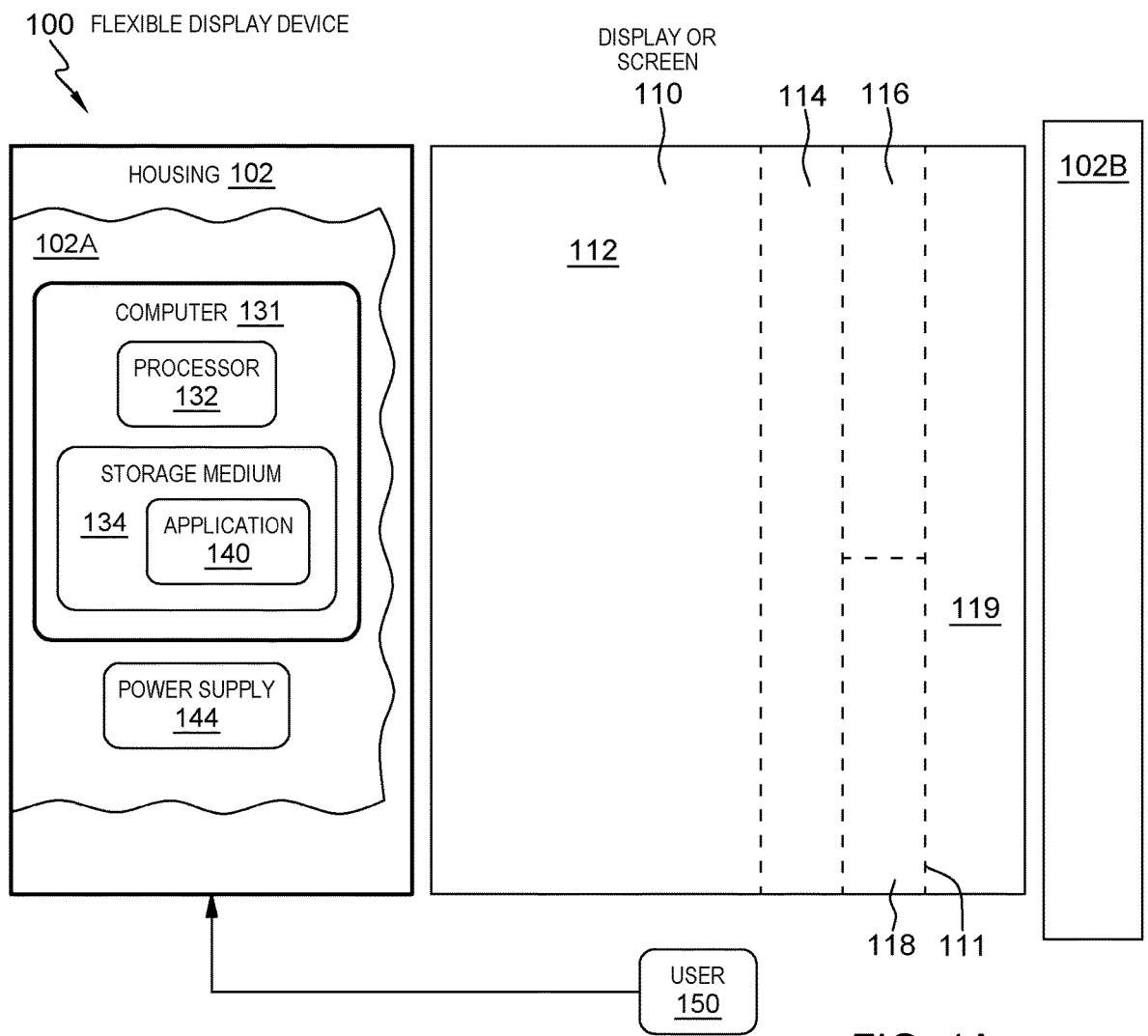
FIG. 1A is a schematic block diagram of a top view illustrating a flexible display device having a rollable display in an extended position, according to an embodiment of the present disclosure.
Figure 1B:
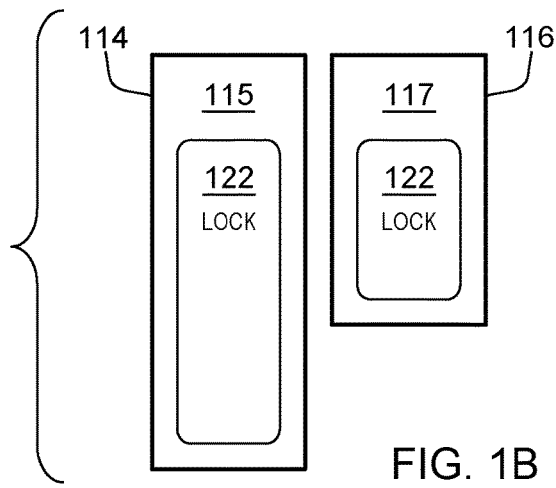
FIG. 1B is a schematic block diagram of a side elevational view of sections shown in FIG. 1A depicting locking mechanisms, according to an embodiment of the present disclosure.

The following description with reference to the accompanying drawings is provided to assist in a comprehensive understanding of exemplary embodiments of the invention as defined by the claims and their equivalents. The description includes various specific details to assist in that understanding, but these are to be regarded as merely exemplary, and assist in providing clarity and conciseness. Accordingly, those of ordinary skill in the art will recognize that various changes and modifications of the embodiments described herein can be made without departing from the scope and spirit of the invention. In addition, descriptions of well-known functions and constructions may be omitted.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

EMBODIMENTS AND EXAMPLES

Referring to FIGS. 1A, 1B, 2 and 3, a computer-implemented method 200 is used for dividing a flexible display 110 of a flexible display device 100 into an articulated flexible display having removable sections, 114, 116, 118 for use as one or more wearable devices, according to an embodiment of the present disclosure. The computer-implemented method 200 includes a series of operational blocks for implementing an embodiment according to the present disclosure which can include the device shown in FIG. 1. The operational blocks of the method according to the present disclosure can include techniques, mechanism, computer modules, and the like, for implementing the functions of the operations in accordance with the present disclosure.

The method 200 includes articulating a display of a flexible display device into a plurality of portions, as in block 204. An articulated display can include dividing the display into a plurality of section or portions, for example sections 112, 114, 116, 118 and 119. The dividing can be implemented along dividing lines 111 extending through the display material of the display 110 such that sections can be completely removed from the display or the full size display when all the sections for the display are connected continuously. The dividing of the articulated display can be implemented by each section defining a front or top surface for viewing the display, and each section having end walls, for example sections 114 and 116 have end walls 115 and 117. The end walls can include a coupling and uncoupling mechanism. For example, the coupling mechanisms can be magnetic locks 314. In one example, as the display is constructed of a flexible material, the removed sections can be rolled or bent into a desired shape. For example, the flexible display can be rollable, and a removed section can be rolled in a circle or circle like shape to be worn as a ring or bracelet.

The method 200 includes dividing the plurality of portions along a plurality of dividing lines each having a locking mechanism, respectively, of a plurality of locking mechanisms, as in block 208.

The method 200 includes connecting electrically a power supply 144 to the locking mechanisms 122 to activate and deactivate the locking mechanisms, as in block 212. A portion of the plurality of portions, border corresponding locking mechanisms of the plurality of locking mechanisms along corresponding dividing lines of the plurality of dividing lines, as in block 212. For example, section 112 includes locking mechanism 122 along an end wall which mates or couples with lock 122 of section 116 along end wall 117. The junctions of the side walls correspond with the dividing lines between sections, as in sections 112 and 114 and dividing line 111.

The method 200 includes the portion being selectable for decoupling and removal, in response to deactivation of the corresponding locking mechanisms for the portion, as in block 216. For example, when the locking mechanisms 122 are deactivated by releasing magnetic attraction by removing power from the power supply 144, sections or portions can be decoupled. Thus, sections can be removed in response to the locking mechanisms being deactivated and decoupling.

In one example, the method can include decoupling and removing the selected portion, in response to deactivation of the corresponding locking mechanisms for the portion, as in block 220.

Figure 2:
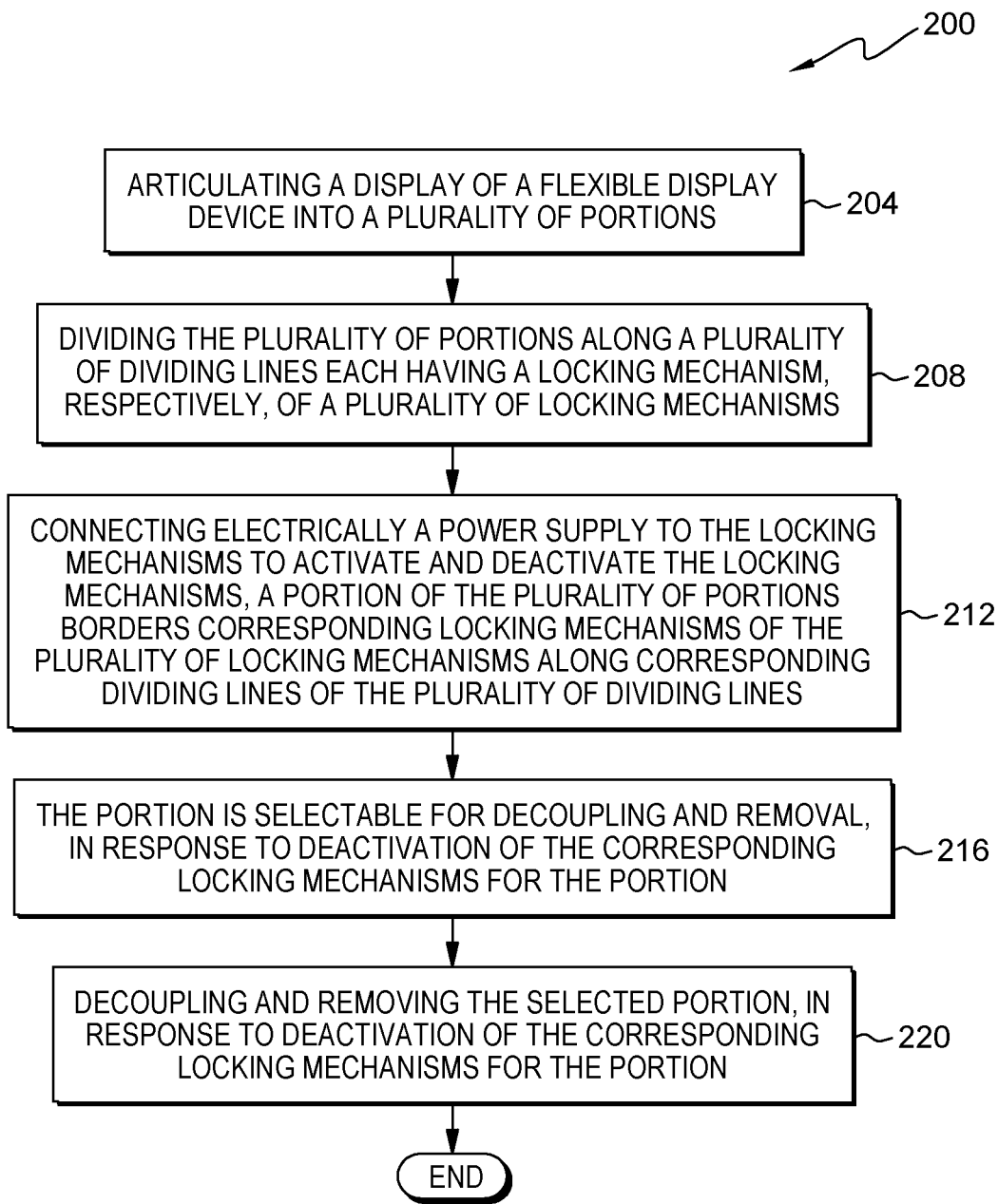
FIG. 2 is a flow chart illustrating a method, implemented using the device shown in FIG. 1, for dividing a flexible display of a flexible display device into an articulated flexible display having removable section for use as on or more wearable devices, according to an embodiment of the present disclosure.
Figure 4A:
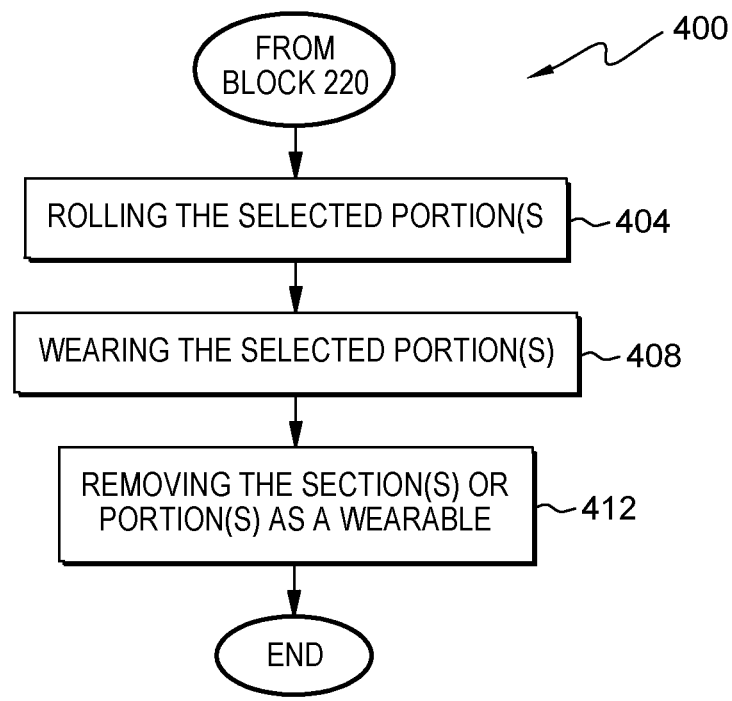
FIG. 4A is a flow chart illustrating another method, which continues from the flow chart of FIG. 2, for dividing a flexible display of a flexible display device into an articulated flexible display having removable section for use as on or more wearable devices.

Referring to FIG. 4A, a method 400 includes, in another example according to the present disclosure, continuing from block 220 of the method 200 shown in FIG. 2, rolling the selected portion(s) 404. For example, a portion can be rolled into a ring. The method 400 includes wearing the selected portion(s), as in block 408. For example, wearing the ring. In one example, a user can remove the one or more sections or portions worn as a wearable, as in block 412.

In one example, the locking mechanisms can be activated to couple the portions to each other to secure the plurality of portions. The one or more locking mechanisms of the plurality of locking mechanisms are selectively deactivatable to decouple corresponding one or more portions of the plurality of portions from each other to release the one or more portions.

Figure 4B:
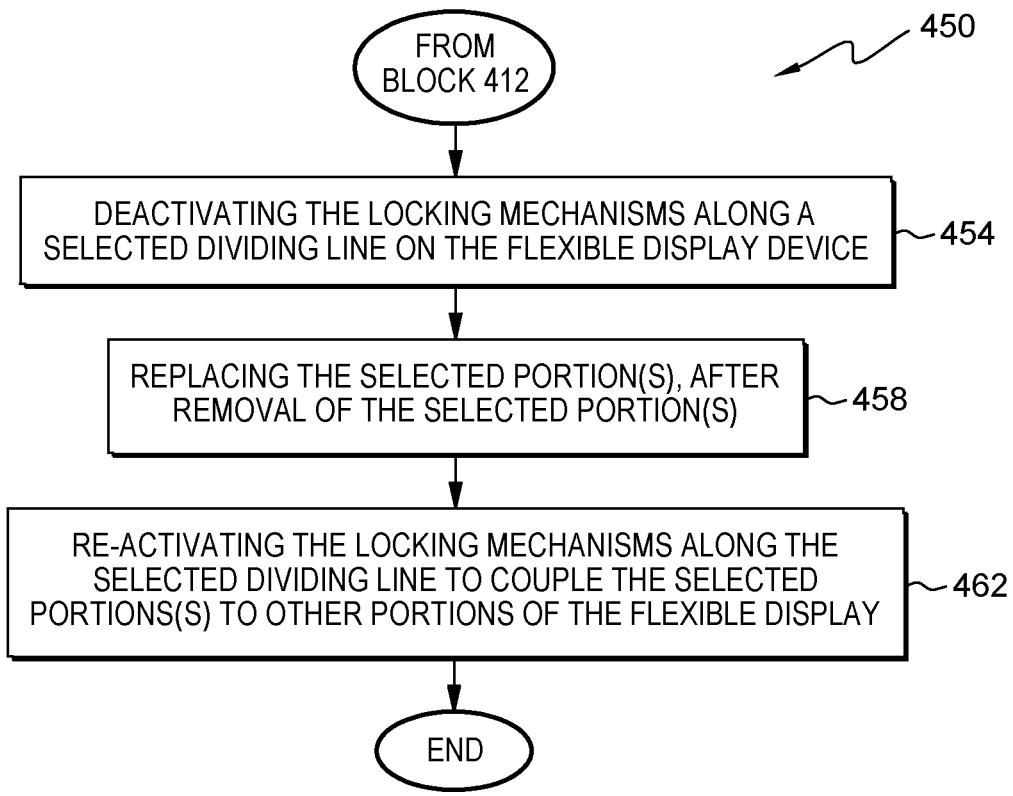
FIG. 4B is a flow chart illustrating another method, which continues from the flow chart of FIG. 2, for dividing a flexible display of a flexible display device into an articulated flexible display having removable section for use as on or more wearable devices.

Referring to FIG. 4B, a method 450 includes, in another example according to the present disclosure, continuing from block 412 of the method 400 shown in FIG. 4A, selected portions for removal are replaceable, in response to removal of the selected portion, in response to deactivating the locking mechanisms along a selected dividing line on the flexible display device, as in block 454. The method includes replacing the selected portions(s), after removal of the selected portions(s), as in block 458, and the corresponding locking mechanisms are activatable, in response to the selected portion being replaced. The method includes re-activating the locking mechanisms along the selected dividing line to couple the selection portion(s) to other portions of the flexible display, as in block 462.

In one example, a flexible display device can include a housing 102 which houses internally 102A a computer 131 within the flexible display device. The computer can be operatively connected to the plurality of locking mechanisms for managing the activation and deactivation of the locking mechanisms using the power supply. In one example, the flexible display can be rollable. In another example, the plurality of locking mechanisms can be magnetic. In another example, wireless power can be provided, using the flexible display device and the power supply, to a portion in response to the portion being removed. For example, the removed portion can be used as a wearable.

In another example, a plurality of portions can be selectable for removal, and corresponding locking mechanisms to the selected portions can be deactivated between the selected portions and other contiguous portions. The locking mechanisms can be along the dividing lines, respectively, for the selected portions, which enables decoupling of the selected flexible portions.

In one embodiment according to the present disclosure, a method can include receiving a request from an augmented reality (AR) device to depict instructions or provide a simulation for dividing and decoupling the selected portion. The method can generate, using the computer, the instructions or the simulation. The method can further send the instructions or the simulation to the AR device, and display the instructions or the simulation on a display of the AR device.

In one embodiment according to the present disclosure, a computer-implemented method for dividing a flexible display device has an articulated display for use as one or more wearable devices, which can include receiving, using a computer of the device, a request or a selection to initiate deactivating locking mechanisms for a portion of an articulated display of the flexible display device. The locking mechanisms are part of a plurality of locking mechanisms along predetermined dividing lines of the articulated display of the flexible display device. The predetermined dividing lines of the flexible device define a plurality of portions of the flexible display device which includes the portion, and the plurality of portions are contiguous with each other. In one example the request or the selection can specify a wearable device corresponding to the request to divide the flexible display. The method can include enabling decoupling and removal of the portion of the flexible display device by the deactivating of the locking mechanisms. The method includes initiating activation of one or more locking mechanisms of the plurality of locking mechanisms, in response to the portion of the flexible display device being removed from the flexible display device. Remaining contiguous portions of the flexible display device can be locked to form a new or rearranged contiguous flexible display.

The method can include deactivating of the locking mechanisms for the portion of the articulated display of the flexible display device, in response to a selection received at a computer of the flexible display device. In one example, the method can include generating a menu using a computer of the flexible display device. The menu can display portions of the articulated display for dividing or splitting from the flexible display device. The method can include receiving a selection from the menu, and the selection can indicate a selected portion from the displayed portions for decoupling and removal from the contiguous plurality of portions. Further, the method can include the enabling of the decoupling and the removal of the portion, which includes the selected portion, is in response to the receiving of the selection from the menu. For example, the method can include deactivating one or more selected locking mechanisms of the plurality of locking mechanisms, for removing a selected portion. In another example, in response to activating or deactivating the locking mechanisms, the locking mechanisms couple and decouple corresponding portions of the plurality of portions, respectively, for securing the plurality of portions together contiguously or for releasing the plurality of portions, respectively.

In another example, the method can include providing power to the plurality of locking mechanisms using the flexible display device, and providing wireless power to a removed portion using the flexible display device. Providing wireless power to a removed portion can include a receiving power supply at a wearable device for powering the wearable device.

In one example, the method can further include receiving a request from an AR device to depict instructions or provide a simulation for dividing and decoupling the selected flexible portion. The method includes generating, using the computer, the instructions or the simulation, and sending the instructions or the simulation to the AR device. The method can include displaying the instructions or the simulation on a display of the AR device.

In another example, the method can further include enabling the locking mechanisms which enable coupling of the selected flexible portion with respect to the other contiguous flexible portions using the locking mechanisms. The locking mechanisms can be enabled in response to the selected flexible portion being positioned between other flexible portions, respectively, to form the contiguous flexible portions, when the locking mechanisms are disabled.

In another example, the method can include receiving a selection, using a computer of the flexible display device. For example, a user can select a section or portions to decouple and remove. In one example, the method can include receiving, using a computer of the flexible display device, a request for the initiating of the deactivation of the locking mechanisms for the portion of the flexible display device. The locking mechanism can be part of a plurality of locking mechanisms along predetermined dividing lines of a flexible display of the flexible display device. The predetermined dividing lines of the flexible device define a plurality of portions of the flexible display device which includes the portion. The plurality of portions are contiguous with each other, and the request specifies a wearable device corresponding to the request to divide the flexible display. The method includes analyzing the request to determine which of the flexible portions to select for the wearable device, and selecting a flexible portion of the plurality of flexible portions based on the analysis.

The portions of the flexible display device can be selectable by a user, and the method can further include receiving a selection for the portion of the flexible display device.

The method can include receiving a selection one or more locking mechanisms of the plurality of locking mechanisms for deactivation. One or more portions of the plurality of portions are replaceable between one or more remaining portions of the plurality of portions. The method can include forming contiguous flexible portions which can be coupled in response to activation of the one or more locking mechanisms, in response to the one or more portions being replaced.

In on embodiment according to present disclosure, a flexible display device, having an integral flexible display, can be divided into one or more wearable devices. The device includes a flexible display of a flexible display device divided into a plurality of portions. The plurality of portions are divided along a plurality of dividing lines each having a locking mechanism, respectively, of a plurality of locking mechanisms, thereby the plurality of portions being contiguous with each other. A power supply is housed within the electrical display device, electrically communicating with the plurality of locking mechanisms. The power supply is switchable on and off to activate and deactivate the locking mechanisms, respectively. One or more of the locking mechanisms are activatable to secure the portions to each other to enable coupling of one or more portions of the plurality of portions. The locking mechanisms are deactivatable to release one or more portions of the plurality of portions from each other to enable decoupling and removal of the one or more portions. A computer is housed within the flexible display device, and the computer can be operatively connected to the plurality of locking mechanisms for managing the activation and deactivation of the locking mechanisms using the power supply.

Other Embodiments and Examples

Referring to FIG. 1, the device 100, also can be referred to as a user device, includes a computer 131 having a processor 132 and a storage medium 134 where an application 140, can be stored. The application can embody the features of the method of the present disclosure as instructions. The user can connect to a learning engine using the device. The device which includes the computer 131 and a display. The application 140 can embody the method of the present disclosure and can be stored on the computer readable storage medium 134. The device 130 can further include the processor 132 for executing the application/software 140. The device 130 can communicate with a communications network, e.g., the Internet. The device 100 includes a power supply 144.

It is understood that the device is representative of similar devices which can be for other users, as representative of such devices, which can include, mobile devices, smart devices, or other computer devices.

Figure 3:
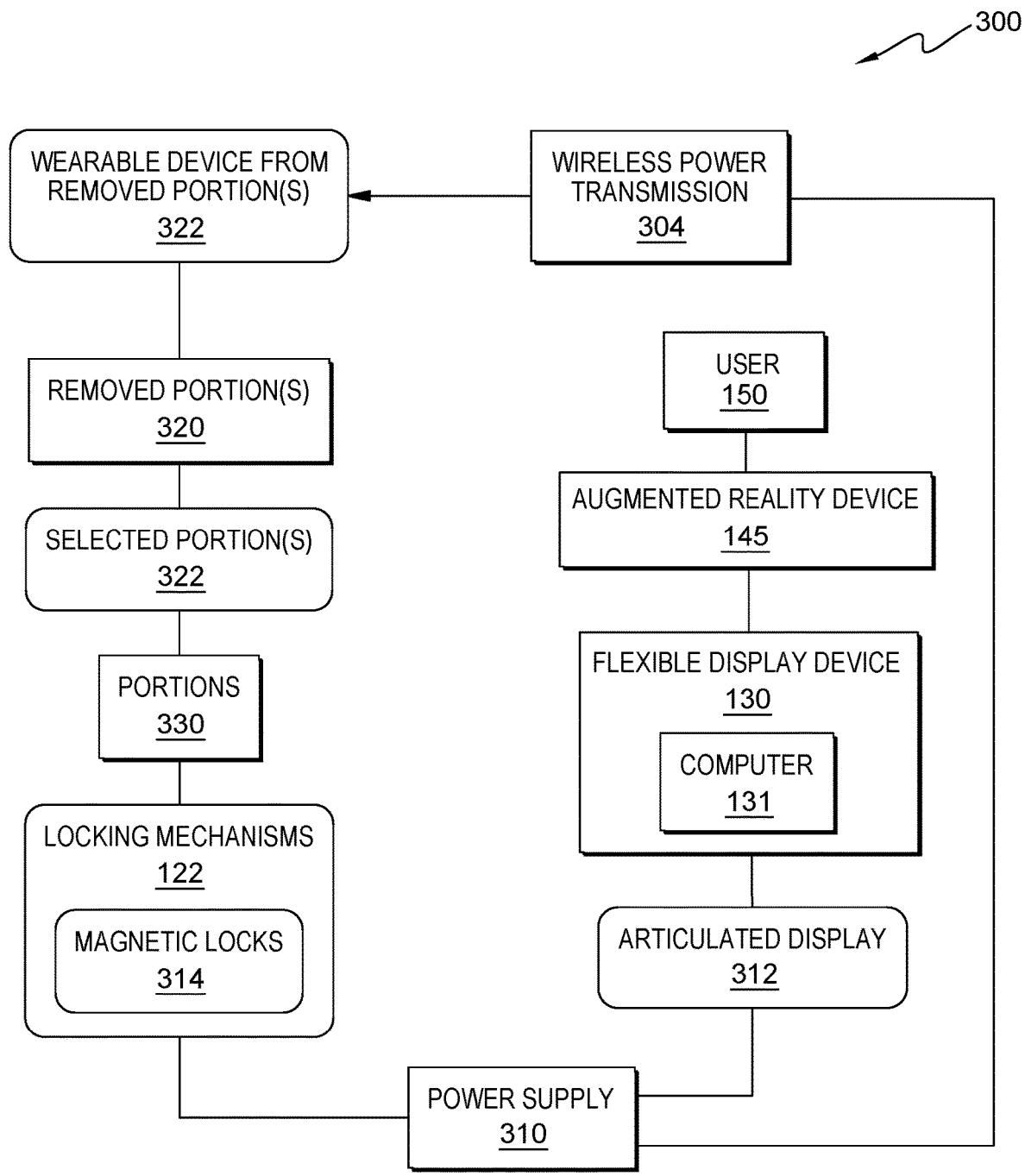
FIG. 3 is a functional schematic block diagram showing a series of operations and functional methodologies, for instructional purposes illustrating functional features of the present disclosure associated with the embodiments shown in the FIGS., which can be implemented, at least in part, in coordination with the device shown in FIG. 1, for dividing a flexible display of a flexible display device into an articulated flexible display having removable section for use as one or more wearable devices.

Additionally, the method and system is discussed with reference to FIG. 3, which is a functional system 300 which includes components and operations for embodiments according to the present disclosure, and is used herein for reference when describing the methods and systems of the present disclosure. Additionally, the functional system 300, according to an embodiment of the present disclosure, depicts functional operation indicative of the embodiments discussed herein.

More Embodiments and Examples

Referring to FIGS. 5A and 5B, and 6A, 6B, 6C and 6D, a system and associated method according to an embodiment of the disclosure, includes a flexible display device, for instance a rollable display device 502 including a rollable display 512 having a rollable display surface 514 of the rollable display device 502 which can physically be split or divided into multiple sections. Each of the split or divided sections can be converted to individual wearable devices, and the same can be merged with the rollable display device to create a single rollable display device. A rollable display, also known as a flexible display, is a type of screen that can be rolled up like a scroll without the image or text being distorted. For example, a rollable display can use, for example, Liquid Crystal Display (LCD), Organic Liquid Crystal Display (OLCD), and Organic Light emitting diode (OLED).

Rollable displays can have advantages over glass, which can include, improved durability, lighter weight, thinner dimensions, and can be curved and used in many devices. One difference between glass and rollable display is that the display area of a rollable display can be bigger than the device itself. If a flexible device measures, for example, 5 inches diagonally and a roll of 7.5 mm, it can be stored in a device smaller than the screen itself and close to 15 mm in thickness.

Figure 5A:
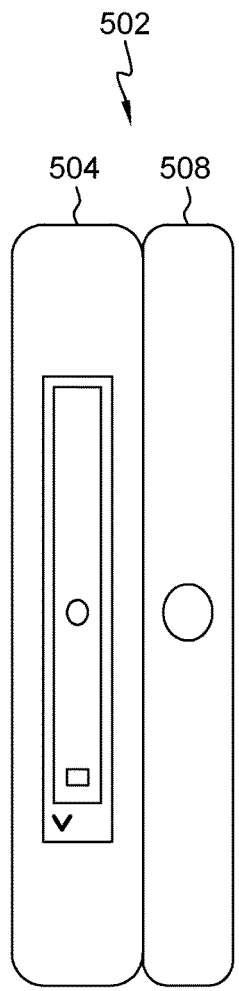
FIG. 5A is a top view of a flexible display device according to an embodiment of the present disclosure, having a flexible display in a closed position.
Figure 5B:
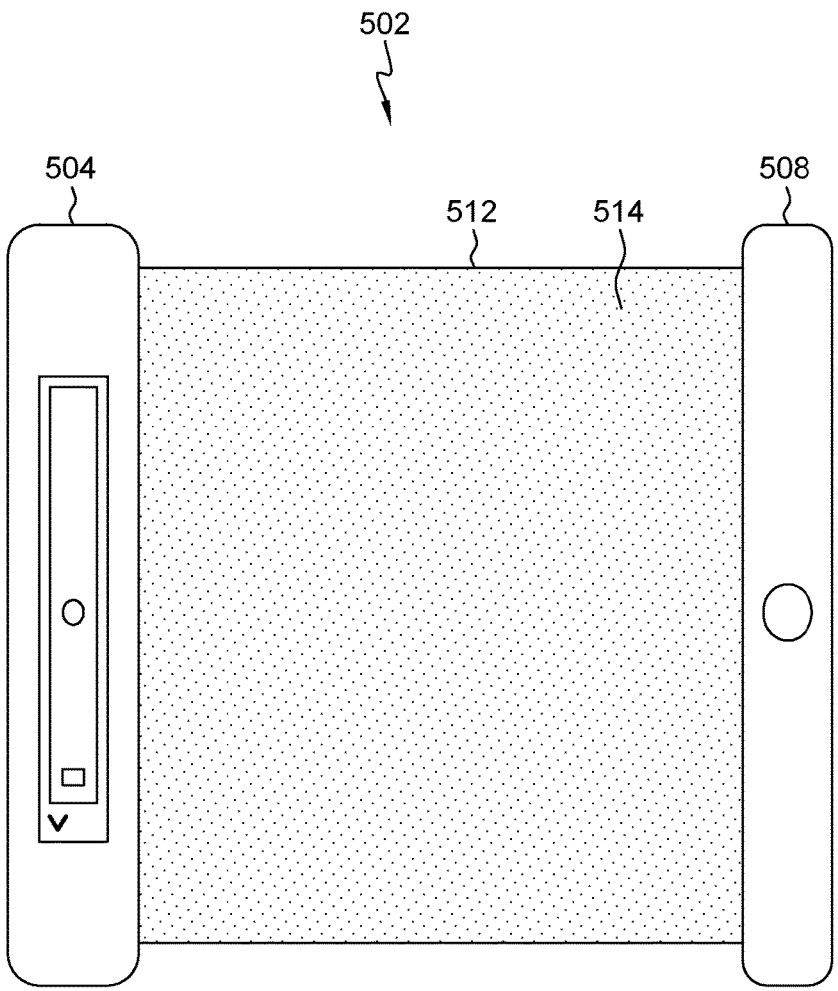
FIG. 5B is a top view of the flexible display device shown in FIG. 5A, having the flexible display in an open position.
Figure 6A:
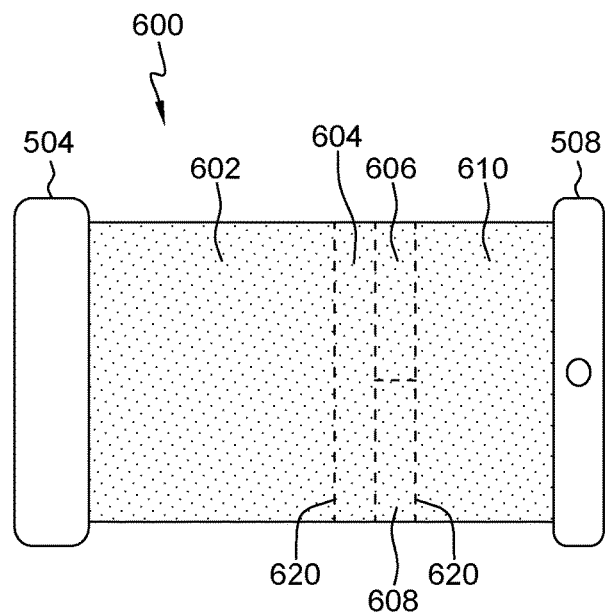
FIG. 6A is a top view of the flexible display device shown in FIG. 5B showing dividing lines and removable sections of the articulated flexible display.
Figure 6B:
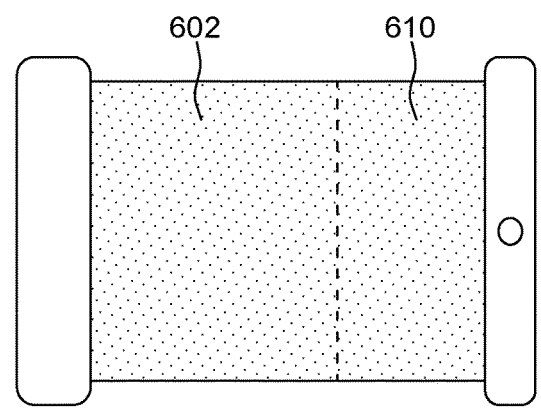
FIG. 6B is a top view of the flexible display device shown in FIG. 6A showing the flexible display with sections removed.
Figure 6C:
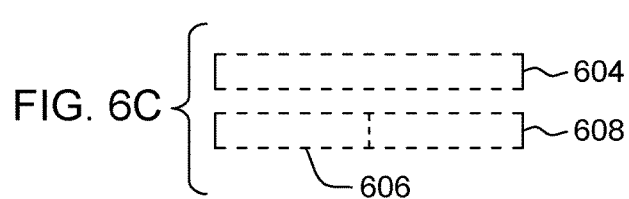
FIG. 6C shows top views of removed sections from FIG. 6A.

Again, referring to FIGS. 5A and 5B, and 6A, 6B, 6C and 6D, a system 600 can enable a user to split the display surface 514 of the rollable display device into multiple sections, and each split or divided section of the display surface can be again converted to wearable device of the user (for example, a smartwatch, finger mounted device, etc.) along with a rollable display device with reduced display area. For example, the system 600 includes the flexible display device for instance a rollable display device 502. The display surface 514 is divided or split into sections 602, 604, 606, 608, and 610 as shown in FIG. 5A. Sections 604, 606 and 608 are removable, and once removed, sections 602 and 610 are connected as shown in FIG. 6B. The user can merge the split display portions (for example, the removed display portions can be converted to wearable display devices, as shown in FIG. 5B), and with the display reduced, the rollable display surface can become the part of the rollable display device with a decreased display area.

In one example, a user can use an augmented reality device or a visual guidance tool/device/simulator to understand how the display device can be split or merged. This can enable or assist the user to create a wearable device with the split portion or portions, and/or assist in reconnecting the rollable display device.

Figure 6D:
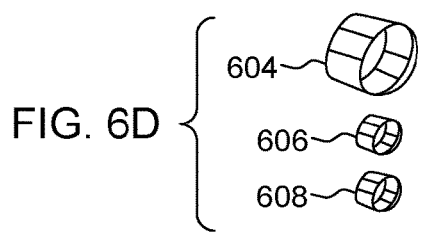
FIG. 6D shows isometric views of the sections removed in FIGS. 6B and 6C rolled into wearable devices.

When user converts the split rollable display surface to wearable device, then based on the position of wearing of the of the converted wearable device, the split portion can be auto-configured to gather relevant data from the user and creating the display area. (like smart watch display area, finger mounted device display area, left handed or right handed etc.). For example, referring to FIG. 6C, sections or portion 604 can be converted to a wearable device as shown in FIG. 6D, and sections 606 and 608 can remain connected and be converted into a wearable device, or separated and converted to wearable devices as shown in FIG. 6D. In one example, based on the need of increasing the display surface of any rollable display device, a user can take additional split portions from other rollable devices and merge with another rollable display device.

Further referring to FIGS. 5A and 5B, and 6A, 6B, 6C and 6D, in one example, the rollable display device 502 includes multiple split or divided areas or portions, for example, sections 602, 604, 606, 608, 610. The sections are connected using respective magnetic locks along dividing lines 620. The edges or dividing lines of the split portions of the rollable display have respective magnetic lock mechanisms. A magnetic lock can include a physical zip-based lock, and power is required for locking and unlocking by creating magnetic displacement of the physical lock.

Each side of a split or divided portion of the rollable display portion can have a magnetic lock. When the magnetic lock is applied, then the split or divided portion can be merged with another split portion or with the remaining portion(s) of the rollable display surface. When the split portions are merged, then the split portion becomes part of the rollable display surface. As per the capability of the rollable display device, the display surface can be rolled, and the same can be converted to a pen like structure, and as required the same can be expanded. The split portion of the rollable display device can be split from the rollable display surface, and the same can be rolled. Based on the pattern of the splitting or dividing, the section can be rolled to convert the split portion into a wearable display for wearing of the converted wearable device. The split portion can be identified and worn by the user as a wearable device. The back of the split portion of the rollable display device can have various sensors, for example, to measure biometric parameters, etc. The split portion can also have various micro components, for instance, camera etc.

The split portion can have a wireless power receiving module, and the same can receive power from the main rollable display device. When a user wants to use wearable devices, and types of wearable display devices, for instance, wristwatch, finger mounted device, etc., then a user can use augmented reality (AR) glass or the rollable display device can visually show how the display surface of the rollable display device needs to be split. The flexible display device can show a menu for unlocking the split portions. Based on a menu selection, a user can split one or more portions from the rollable display surface. After the required portions are split, the user can connect the two ends of the rollable display device and make a smaller display dimension rollable display device. The split portions can be rolled and a user can make a wearable device, for instance, the user can wear the same on the wrist, or on different fingers. Based on the position of wearing the split portion, the system can be converting the split portion as a wearable device. Based on the positioning of wearing the split portion, the portion can be considered as an individual device. Once the split portions are used in different areas as a wearable device, then based on wearing location, the device can be auto-configured. A user can take of the wearable devices off, and can merge the same with the rollable display area to make a larger display area of rollable display device.

According to embodiments of the present disclosure, a system and a method is described by which a user can keep each wearable device together and can also split the display area to create individual wearable devices of the user as per the need. More particularly, a method can include splitting a display surface of a rollable display device into multiple sections, and each split section of the display surface can be converted to a wearable device of the user (like a smartwatch, a finger mounted device, etc.) along with a rollable display device with reduced display area. The split display portions (which were converted to wearable display device above with the display reduced rollable display surface, can become the part of the rollable display device with increased display area of rollable display device. The method can include using an augmented reality device or with any visual guidance tools/devices/simulators, a user can understand how the display device can be split or merged, so that the user can create a wearable device with the split portions and can make or assemble all or part of the rollable display device. The method can include when a user converts the split rollable display surface to a wearable device, then based on the position of wearing of the converted wearable device, the split portion can be auto-configured to gather relevant data from the user and creating the display area, (like a smart watch display area, finger mounted device display area, left handed or right handed device, etc.). The method can include, based on the need of increasing the display surface of any rollable display device, adding additional split portions from other rollable devices and merging with another rollable display device.

Embodiments of the present disclosure include a method where a rollable display surface of a rollable display device can physically be split into multiple sections and each split sections can be converted to individual wearable devices. Thereby a user can wear one or more sections as a wearable device.

More Examples and Embodiments

Operational blocks and system components shown in one or more of the figures may be similar to operational blocks and system components in other figures. The diversity of operational blocks and system components depicting example embodiments and aspects according to the present disclosure. For example, the method shown in FIG. 4 is intended as another example embodiment which can include aspects/operations shown and discussed previously in the present disclosure, in one example, continuing from a previous method shown in associated flow chart.

Additional Examples and Embodiments

It is understood that the features shown in some of the FIGS., for example block diagrams, are functional representations of features of the present disclosure. Such features are shown in embodiments of the systems and methods of the present disclosure for illustrative purposes to clarify the functionality of features of the present disclosure.

The methods and systems of the present disclosure can include a series of operation blocks for implementing one or more embodiments according to the present disclosure. In some examples, operational blocks of one or more FIGS. may be similar to operational blocks shown in another figure. A method shown in one FIG. may be another example embodiment which can include aspects/operations shown in another FIG. and discussed previously.

More Embodiments and Examples

Figure 7:
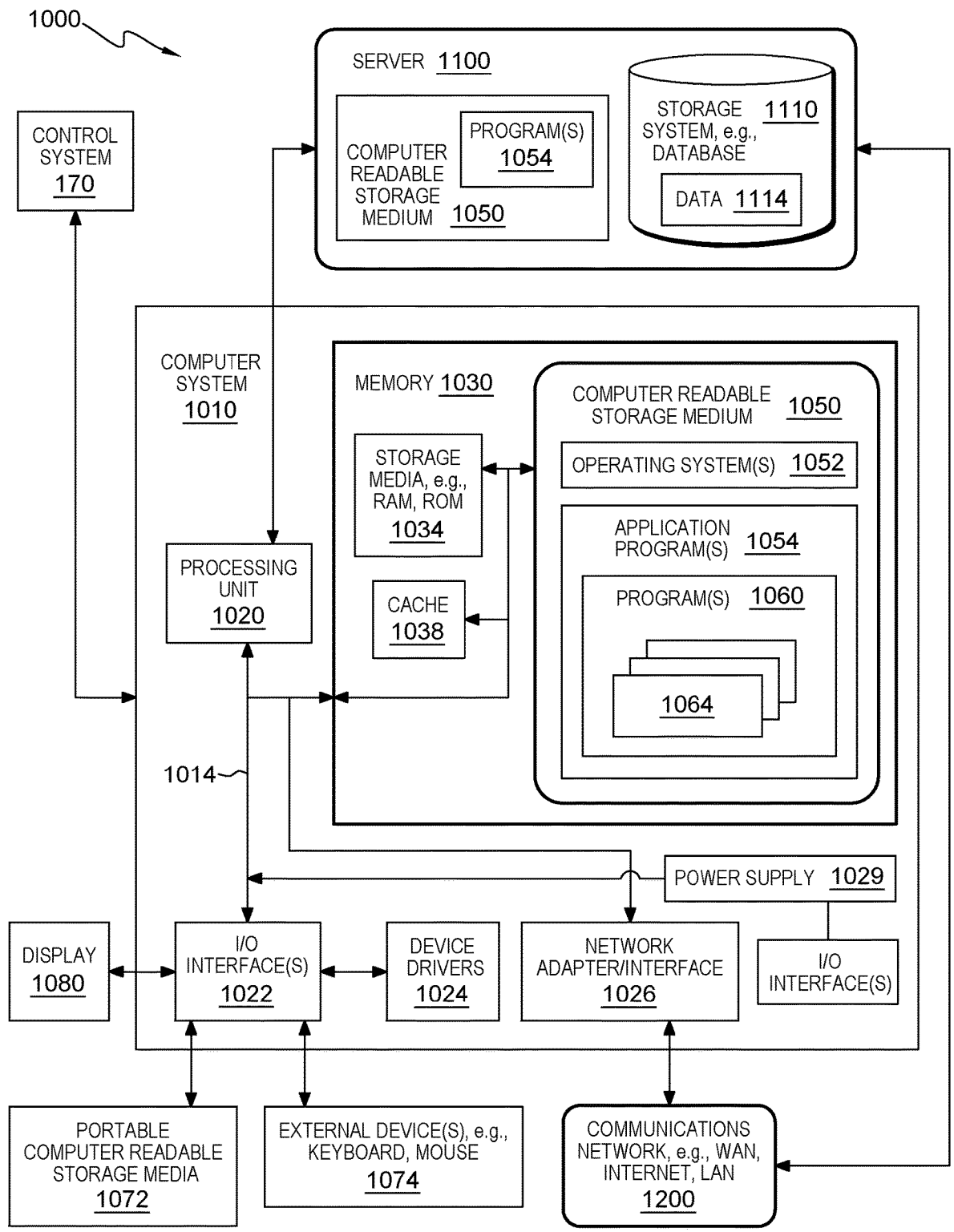
FIG. 7 is a schematic block diagram depicting a computer system according to an embodiment of the disclosure which may be incorporated, all or in part, in one or more computers or devices shown in FIG. 1, and cooperates with the systems and methods shown in the FIGS.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further Additional Examples and Embodiments Referring to FIG. 7, an embodiment of system or computer environment 1000, according to the present disclosure, includes a computer system 1010 shown in the form of a generic computing device. The method 100, for example, may be embodied in a program 1060, including program instructions, embodied on a computer readable storage device, or a computer readable storage medium, for example, generally referred to as computer memory 1030 and more specifically, computer readable storage medium 1050. Such memory and/or computer readable storage media includes non-volatile memory or non-volatile storage, also known and referred to non-transient computer readable storage media, or non-transitory computer readable storage media. For example, such non-volatile memory can also be disk storage devices, including one or more hard drives. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020. A power supply 1029 is connected to the bus for supplying power to the computer and components, and connects to an I/O interface, for example a battery supply can supply power and/or electrical power can be supplied.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that a control system 170, communicating with a computer system, can include all or part of the computer system 1010 and its components, and/or the control system can communicate with all or part of the computer system 1010 and its components as a remote computer system, to achieve the control system functions described in the present disclosure. The control system function, for example, can include storing, processing, and executing software instructions to perform the functions of the present disclosure. It is also understood that the one or more computers or computer systems shown in FIG. 1 similarly can include all or part of the computer system 1010 and its components, and/or the one or more computers can communicate with all or part of the computer system 1010 and its components as a remote computer system, to achieve the computer functions described in the present disclosure.

In an embodiment according to the present disclosure, one or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions. For example, in one embedment according to the present disclosure, a program embodying a method is embodied in, or encoded in, a computer readable storage medium, which includes and is defined as, a non-transient or non-transitory computer readable storage medium. Thus, embodiments or examples according to the present disclosure, of a computer readable storage medium do not include a signal, and embodiments can include one or more non-transient or non-transitory computer readable storage mediums. Thereby, in one example, a program can be recorded on a computer readable storage medium and become structurally and functionally interrelated to the medium.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Still Further Additional Examples and Embodiments

Figure 8:
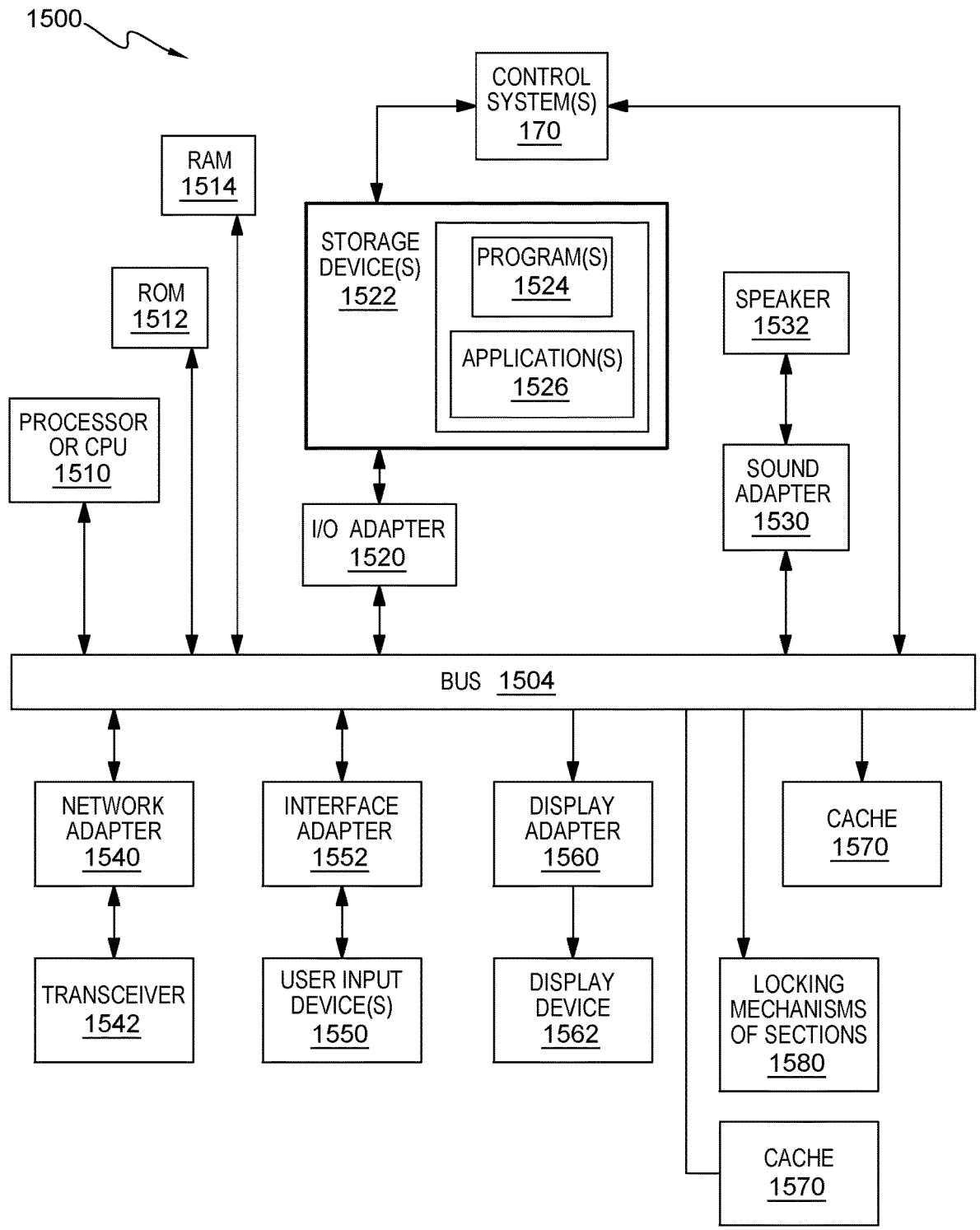
FIG. 8 is a schematic block diagram of a system depicting system components interconnected using a bus. The components for use, in all or in part, with the embodiments of the present disclosure, in accordance with one or more embodiments of the present disclosure.

Referring to FIG. 8, an example system 1500 for use with the embodiments of the present disclosure is depicted. The system 1500 includes a plurality of components and elements connected via a system bus 1504. At least one processor (CPU) 1510, is connected to other components via the system bus 1504. A cache 1570, a Read Only Memory (ROM) 1512, a Random Access Memory (RAM) 1514, an input/output (I/O) adapter 1520, a sound adapter 1530, a network adapter 1540, a user interface adapter 1552, a display adapter 1560 and a display device 1562, are also operatively coupled to the system bus 1504 of the system 1500. Locking mechanisms of display sections 1580 can also be operatively coupled to the bus 1504. A power supply 1590 can also be operatively connected to the bus 1504 for providing power to components and for functions according to the present disclosure.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. The storage device can include, for example, but not limited to, a hard drive or flash memory and be used to store one or more programs 1524 or applications 1526. The programs and applications are shown as generic components and are executable using the processor 1510. The program 1524 and/or application 1526 can include all of, or part of, programs or applications discussed in the present disclosure, as well vice versa, that is, the program 1524 and the application 1526 can be part of other applications or program discussed in the present disclosure.

The system 1500 can include the control system 170 which communicates with the system bus, and thus can communicate with the other components of the system via the system bus. In one example, the storage device 1522, via the system bus, can communicate with the control system 170 which has various functions as described in the present disclosure.

In one aspect, a speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

In another aspect, one or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices. The user input devices 1550 are used to input and output information to and from the system 1500.

Other Aspects and Examples

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for dividing a flexible display into removable sections for use as one or more wearable devices, comprising:
    articulating a display of a flexible display device into a plurality of portions, the plurality of portions being divided along a plurality of dividing lines each having a locking mechanism, respectively, of a plurality of locking mechanisms; and
    connecting electrically a power supply to the locking mechanisms to activate and deactivate the locking mechanisms, a portion of the plurality of portions borders corresponding locking mechanisms of the plurality of locking mechanisms along corresponding dividing lines of the plurality of dividing lines;
    in response to deactivation of the corresponding locking mechanisms for the portion, the portion being decouplable and removable;
    connecting the power supply to the portion as part of converting the portion to a wearable device to be used by a user, when the portion is decoupled and removed from the display.

2. The method of claim 1, wherein a selected portion is replaceable, in response to removal of the selected portion, and the corresponding locking mechanisms are activatable, in response to the selected portion being replaced.

3. The method of claim 1, wherein the locking mechanisms are activatable to couple the plurality of portions to each other to secure the plurality of portions, and one or more locking mechanisms of the plurality of locking mechanisms being selectably deactivatable to decouple corresponding one or more portions of the plurality of portions from each other to release the one or more portions.

4. The method of claim 1, further comprising:
    housing a computer within the flexible display device, and operatively connecting the computer to the plurality of locking mechanisms for managing the activation and deactivation of the locking mechanisms using the power supply.

5. The method of claim 1, wherein the flexible display is rollable.

6. The method of claim 1, wherein the plurality of locking mechanisms are magnetic.

7. The method of claim 1, wherein wireless power is providable, using the flexible display device, to a portion in response to the portion being removed.

8. The method of claim 1, further comprising:
    a plurality of portions being selectable for removal; and
    corresponding locking mechanisms to selected portions being deactivatable between the selected portions and other contiguous portions, the locking mechanisms being along the dividing lines, respectively, for the selected portions, which enables decoupling of the selected portions.

9. The method of claim 1, further comprising:
    receiving a request from an augmented reality (AR) device to depict instructions or provide a simulation for dividing and decoupling a selected portion;
    generate, using a computer, the instructions or the simulation;
    sending the instructions or the simulation to the AR device; and
    displaying the instructions or the simulation on a display of the AR device.

10. A computer-implemented method for dividing a flexible display into removable sections for use as one or more wearable devices, comprising:
    deactivating locking mechanisms for a portion of an articulated display of a flexible display device, the locking mechanisms being part of a plurality of locking mechanisms along predetermined dividing lines of the articulated display of the flexible display device, the predetermined dividing lines of the flexible device defining a plurality of portions of the flexible display device which includes the portion, the plurality of portions being contiguous with each other;
    enabling decoupling and removal of the portion of the flexible display device by the deactivating of the locking mechanisms;
    connecting a power supply to the portion as part of converting the portion to a wearable device to be used by a user, when the portion is decoupled and removed from the display; and
    initiating activation of one or more locking mechanisms of the plurality of locking mechanisms, in response to the portion of the flexible display device being removed from the flexible display device, to lock remaining contiguous portions of the flexible display device.

11. The method of claim 10, wherein the deactivating of the locking mechanisms for the portion of the articulated display of the flexible display device is in response to a selection received at a computer of the flexible display device.

12. The method of claim 10, further comprising:
    generating a menu using a computer of the flexible display device, the menu displaying portions of the articulated display for dividing or splitting from the flexible display device; and
    receiving a selection from the menu, the selection indicating a selected portion from the displayed portions for decoupling and removal from the contiguous plurality of portions, and wherein the enabling of the decoupling and the removal of the portion, which includes the selected portion, is in response to the receiving of the selection from the menu.

13. The method of claim 10, wherein in response to activating or deactivating the locking mechanisms, the locking mechanisms couple and decouple corresponding portions of the plurality of portions, respectively, for securing the plurality of portions together contiguously or for releasing the plurality of portions, respectively.

14. The method of claim 10, further comprising:
providing power to the plurality of locking mechanisms using the flexible display device, and providing wireless power to the removed portion using the flexible display device.

15. The method of claim 10, further comprising:
receiving a request from an augmented reality (AR) device to depict instructions or provide a simulation for dividing and decoupling a selected portion;
generate, using a computer, the instructions or the simulation;
sending the instructions or the simulation to the AR device; and
displaying the instructions or the simulation on a display of the AR device.

16. The method of claim 10, further comprising:
receiving a selection, using a computer of the flexible display device.

17. The method of claim 10, further comprising:
receiving, using a computer of the flexible display device, a request for initiating of the deactivation of the locking mechanisms for the portion of the flexible display device, the locking mechanisms being part of the plurality of locking mechanisms along the predetermined dividing lines of the flexible display of the flexible display device, the request specifying a wearable device corresponding to the request to divide the flexible display;
analyzing the request to determine which of the portions to select for the wearable device; and
selecting the portion based on the analysis.

18. The method of claim 10, wherein the portions of the flexible display device are selectable by a user, and the method further comprising:
receiving a selection for the portion of the flexible display device.

19. The method of claim 10, further comprising:
receiving a selection of one or more locking mechanisms of the plurality of locking mechanisms for deactivation, one or more portions of the plurality of portions being replaceable between one or more remaining portions of the plurality of portions; and
forming contiguous flexible portions being coupleable in response to activation of the one or more locking mechanisms, in response to the one or more portions being replaced.

20. A flexible display device including a divided articulated display having removable sections for use as one or more wearable devices, which comprises:
a flexible display of the flexible display device divided into a plurality of portions, the plurality of portions being divided along a plurality of dividing lines each having a locking mechanism, respectively, of a plurality of locking mechanisms, thereby the plurality of portions being contiguous with each other;
a power supply, housed within the flexible display device, electrically communicating with the plurality of locking mechanisms, the power supply being switchable on and off to activate and deactivate the locking mechanisms, respectively, and wherein one or more of the locking mechanisms are activatable to secure the plurality of portions to each other to enable coupling of one or more portions of the plurality of portions, and the locking mechanisms are deactivatable to release the one or more portions of the plurality of portions from each other to enable decoupling and removal of the one or more portions;
power being supplied from the power supply to a portion of the one or more portions as part of converting the portion to a wearable device to be used by a user, when the portion is decoupled and removed from the display; and
a computer housed within the flexible display device, and the computer operatively connected to the plurality of locking mechanisms for managing the activation and deactivation of the locking mechanisms using the power supply.

* * * * *